(12) United States Patent
Baxter et al.

(10) Patent No.: US 10,722,812 B2
(45) Date of Patent: Jul. 28, 2020

(54) SYSTEM WITH A DIRECT CONTACT DESUBLIMATING HEAT EXCHANGER AND TEMPERATURE REGULATION

(71) Applicants: Larry Baxter, Orem, UT (US); Kyler Stitt, Lindon, UT (US); Aaron Sayre, Spanish Fork, UT (US); Christopher Hoeger, Provo, UT (US)

(72) Inventors: Larry Baxter, Orem, UT (US); Kyler Stitt, Lindon, UT (US); Aaron Sayre, Spanish Fork, UT (US); Christopher Hoeger, Provo, UT (US)

(73) Assignee: Hall Labs LLC, Provo, UT (US)

( * ) Notice: Subject to any disclaimer, the term of this patent is extended or adjusted under 35 U.S.C. 154(b) by 397 days.

(21) Appl. No.: 15/488,784

(22) Filed: Apr. 17, 2017

(65) Prior Publication Data
US 2018/0299200 A1 Oct. 18, 2018

(51) Int. Cl.
| | | |
|---|---|---|
| *F25J 3/06* | (2006.01) | |
| *B01D 7/00* | (2006.01) | |
| *B01D 8/00* | (2006.01) | |
| *B01D 5/00* | (2006.01) | |
| *B01D 9/00* | (2006.01) | |

(52) U.S. Cl.
CPC ............ *B01D 7/00* (2013.01); *B01D 5/00* (2013.01); *B01D 8/00* (2013.01); *B01D 9/00* (2013.01); *B01D 9/0009* (2013.01)

(58) Field of Classification Search
CPC .......... B01D 8/00; B01D 9/0009; B01D 9/00; B01D 5/00
USPC ......................................................... 62/617
See application file for complete search history.

(56) References Cited

U.S. PATENT DOCUMENTS

2013/0036764 A1* 2/2013 VanOsdol ............ B01D 53/002
62/617

\* cited by examiner

*Primary Examiner* — Elizabeth J Martin
*Assistant Examiner* — Nael N Babaa

(57) ABSTRACT

A process to prevent fouling using a desublimating heat exchanger is disclosed. An outlet stream from the desublimating heat exchanger may be split into a plurality of parallel streams. The parallel streams may be sent through a plurality of discrete unit operations, and the unit operations may change the temperature of at least one of the parallel streams. Parallel streams of differing temperature may emerge from the unit operations. The parallel streams which are of a similar temperature may be mixed to form a warm stream and a cool stream. The warm stream and the cool stream may be sent to a mixing chamber. A mixed stream of substantially uniform temperature may emerge from the mixing chamber, and the mixed stream may be recycled back to the desublimating heat exchanger. The mixing chamber may be separate from the desublimating heat exchanger, or the parallel streams of differing temperature may be mixed in the desublimating heat exchanger.

8 Claims, 10 Drawing Sheets

SYSTEM WITH A DIRECT CONTACT DESUBLIMATING HEAT EXCHANGER AND TEMPERATURE REGULATION

This invention was made with government support under DE-FE0028697 awarded by The Department of Energy. The government has certain rights in the invention.

BACKGROUND

Field of the Invention

The disclosed embodiments relate to methods and systems for decreasing heat-transfer inhibiting mass accumulation in an apparatus such as a direct exchange heat exchanger for desublimating the condensable vapors, such as carbon dioxide, from a process stream.

Background of the Invention

The separation of carbon dioxide from other light gases such as nitrogen is important for achieving carbon dioxide sequestration. Flue gas from a conventional power station typically includes from about 4% (vol.) to about 16% (vol.) carbon dioxide (CO2). It is commonly believed that this CO2 represents a significant factor in increasing the greenhouse effect and global warming.

Currently described systems and methods include separating condensable vapors (e.g., carbon dioxide) from other gases (e.g., nitrogen) in a continuous separation process. See International Patent Application PCT/US2011/061737, which is incorporated by reference. The separation process is carried out in a direct contact heat exchanger (DCHE), which may be referred to as a bubbler, in which a process stream comprising condensable vapors and light gases come in direct, physical contact with a non-volatile heat exchange liquid (NVHEL). The NVHEL cools the process stream and causes the condensable vapors to desublimate, thereby forming a slurry of desublimated solids and the NVHEL. The desublimation of the condensable vapors also causes separation of the vapors from other gases in the process stream, thereby forming a separated light-gas stream.

The process of desublimation may use low temperatures so that substances such as carbon dioxide are converted from the gas state to the solid state and may result in heat-transfer inhibiting mass accumulation, such as frosting or fouling, on elements of the equipment used during known systems and methods for separating condensable vapors.

Processes may be performed, via devices for performing a unit operation, on liquids and gases, which may result in the liquids or gases having a changed temperature. In some situations, it may be desirable to mix a liquid or gas stream with other liquids or gases. Sometimes the mixing of gases or liquids of a certain temperature with a liquid or gas of a different temperature may result in freezing of equipment, fouling of equipment, excess warming of a liquid or gas stream that may result in vaporization or gas in undesired places.

Additionally, having streams of various temperatures exit or enter various equipment, such as a heat exchanger, may result in difficulties in controlling the temperature at various points in a process. Consequently, a need still exists for controlling the temperature of various equipment and processes.

SUMMARY

Figure 1:
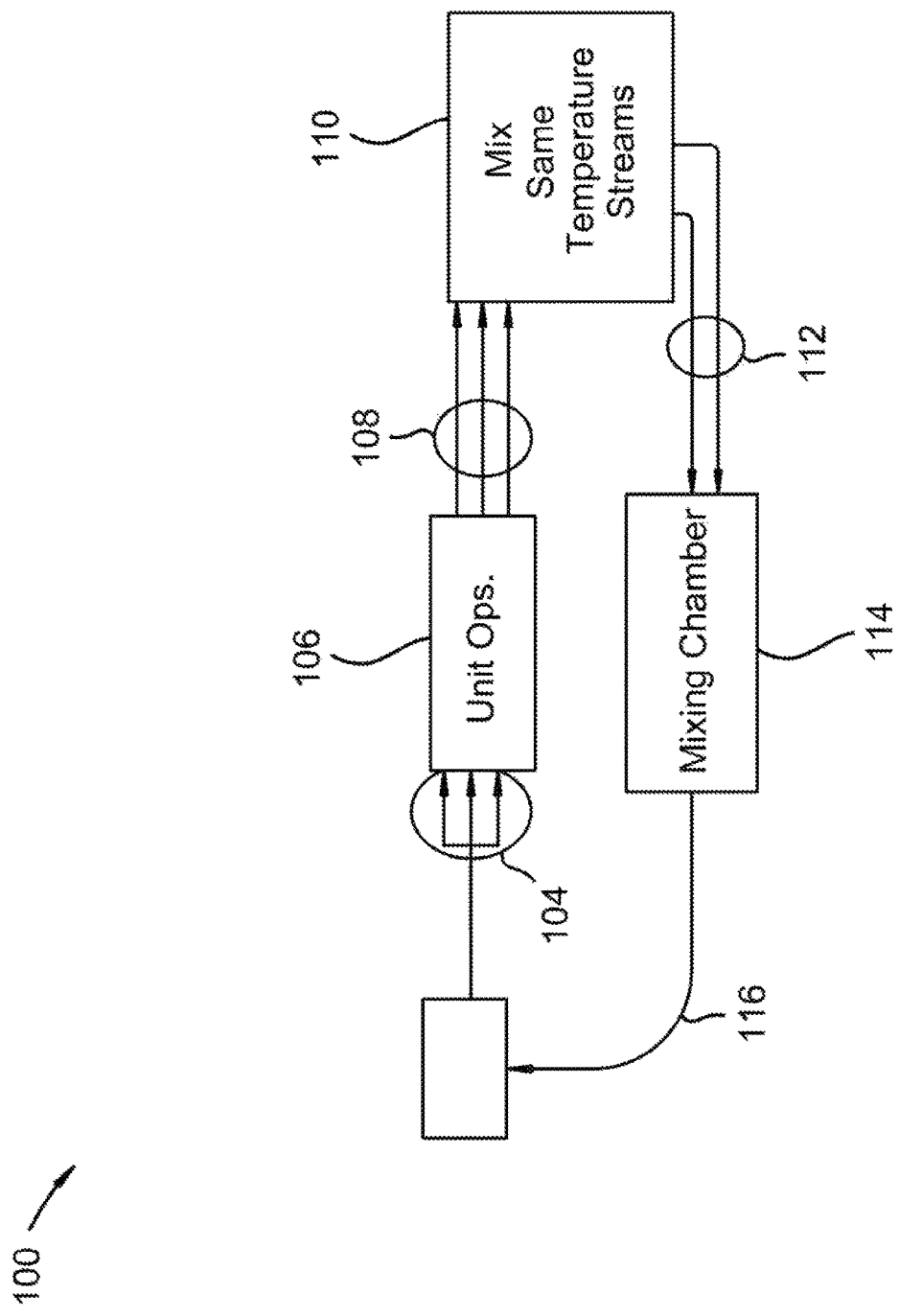
FIG. 1 is an illustration of a process for preventing fouling in a process using a desublimating heat exchanger, involving mixing of similar temperature streams.

In the present specification and in the appended, the term device for performing a unit operation refers to a step in a process which involves a physical change or chemical transformation. For example, a unit operation may be a screw press, a heat exchanger, or a separation unit.

In the present specification and in the appended claims, the term stages refers to a series of plates and downcomers used to increase the efficiency of heat transfer, as in a desublimating heat exchanger. Plates may be arranged substantially horizontally within the desublimating heat exchanger; plates may be arranged substantially vertically within the desublimating heat exchanger.

The phrase "a number of" means one, two, or more of a certain item, object, or action. A number of canisters would mean a quantity of canisters equal to one, two, three, or any other counting number greater than 3.

In some embodiments the system includes a stirring mechanism in the mixing chamber configured to stir the contents of the mixing chamber, the stirring mechanism comprises a stirring rod operably coupled to a stirring assembly comprising a power source and a rotating gear system coupled to the stirring rod.

DETAILED DESCRIPTION

A detailed description of the claimed invention is provided below by example, with reference to examples in the appended figures. Those of skill in the art will recognize that the components and steps of the invention as described by example in the figures below could be arranged and designed in a wide variety of different configurations without departing from the substance of the claimed invention. Thus, the detailed description of the examples in the figures is merely representative examples of the invention, and is not intended to limit the scope of the invention as claimed.

References to a number when used as an article, such as a number of servers, is a number greater than zero; for example a number of sensors includes 1, 2, 3, or other positive counting numbers other than zero. Unless stated otherwise, the term "values" include any number, such as negative numbers, irrational numbers, positive numbers, and the number zero.

For purposes of this disclosure, the modules refer to a combination of hardware and program instructions to perform a designated function. Each of the modules may include a processor and memory. The program instructions are stored in the memory, and cause the processor to execute the designated function of the modules.

For purposes of this disclosure liquid streams also includes a liquid stream entrained with solids and a slurry stream.

In the present specification and in the appended, the term unit operations refers to a step in a process which involves a physical change or chemical transformation. For example, a unit operation may be a screw press, a heat exchanger, or a separation unit.

In the preferred embodiments the desublimating heat exchanger includes an amount of cryogenic liquid; the cryogenic liquid may be selected from the following list of cryogenic liquid or liquids: The cryogenic liquid may comprise 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

FIG. 1 is an illustration of a basic process (100) to prevent fouling in a process using a desublimating heat exchanger (500). An outlet stream (102) from the desublimating heat exchanger (500) may be split into a plurality of parallel streams (104). The parallel streams (104) may be sent through discrete unit operations (106), and the unit operations (106) may change the temperature of at least one of the parallel streams (104). Parallel streams of differing temperature (108) may emerge from the unit operations (106). The higher temperature parallel streams may be mixed to form a warm stream. The lower temperature parallel streams may be mixed to form a cool stream. The warm stream and the cool stream (112) may be injected into a mixing chamber (114). A mixed stream of substantially uniform temperature (116) may emerge from the mixing chamber (114), and the mixed stream (116) may be recycled back to the desublimating heat exchanger.

Figure 2B:
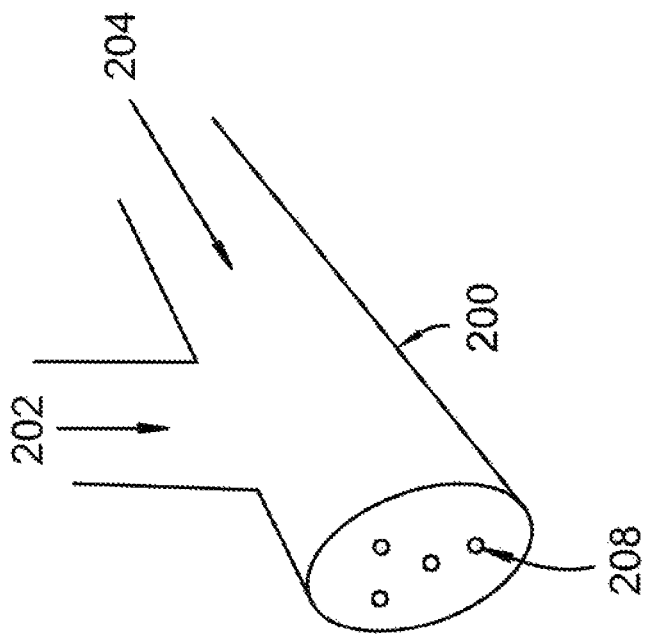
FIG. 2B is an illustration of the fouling that may occur in a process using a desublimating heat exchanger with some of the liquid vaporizing.
Figure 2A:
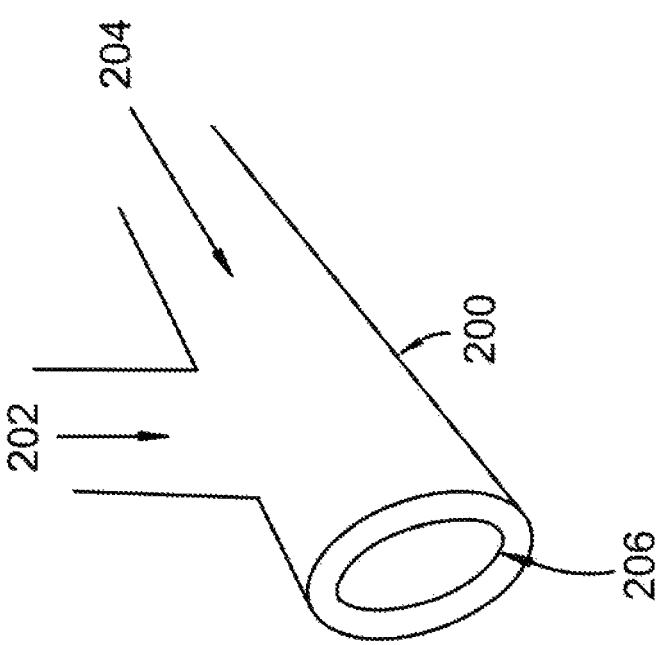
FIG. 2A is an illustration of the fouling that may occur in a process using a desublimating heat exchanger with solid freezing out of solution.

FIG. 2 is an illustration of the fouling that may occur in a process using a desublimating heat exchanger without a mixing chamber. FIG. 2A depicts a solid buildup (206) on the walls of a pipe in a process using a desublimating heat exchanger. In some preferred embodiments, the buildup may be caused by carbon dioxide in a warm stream (202). The warm stream (202) may mix with a cool stream (204), and the carbon dioxide may freeze out of the solution and build up on the walls of the pipe.

FIG. 2B depicts cavitation in a pipe. In some embodiments, mixing the warm stream (202) with the cool stream (204) may cause some of the cool stream to vaporize (208). In some embodiments, a much warmer stream may come into contact with a solid or liquid carbon dioxide heavy stream, and cavitation (208) may occur.

Figure 3:
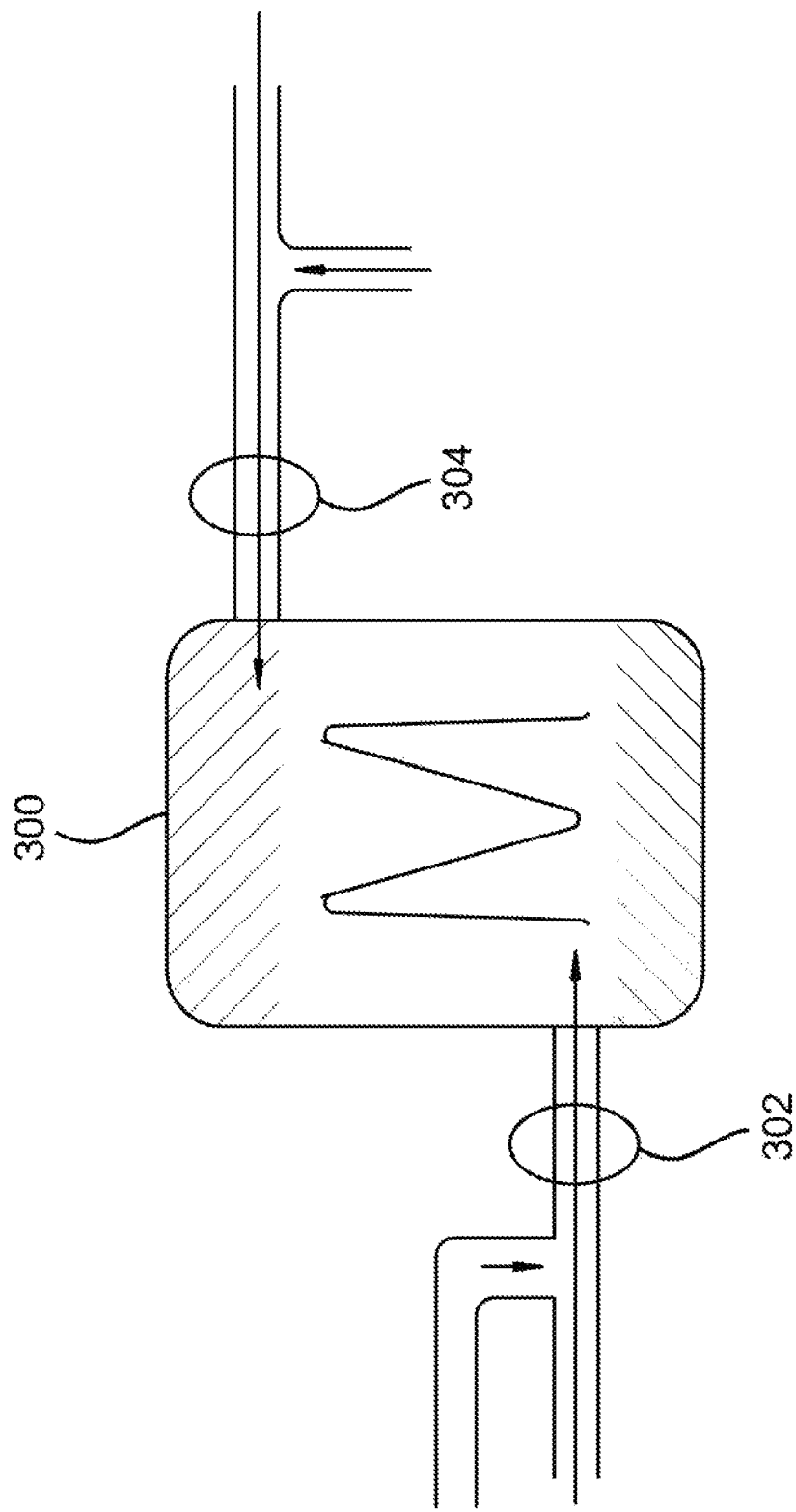
FIG. 3 is an illustration of a mixing chamber to be used in a process as in FIG. 1.

FIG. 3 is an illustration of a mixing chamber, such as the one depicted in FIG. 1. In some embodiments, the mixing chamber (300) may additionally comprise a stirring mechanism. In some preferred embodiments, the injected liquids in the mixing chamber may mix due to differences in density. A warm stream (302) may be injected into the bottom of the mixing chamber, with a cool stream (304) injected into the top of the mixing chamber. The warm stream (302) may have a lower density than the cool stream (304). Due to this difference in density, the liquid from the warm stream may rise toward the top of the mixing chamber while the liquid from the cool stream may sink toward the bottom of the mixing chamber, thus causing the two different temperature liquids to mix. As they mix, the two different temperature liquids may exchange heat and reach a substantially uniform temperature. In some embodiments the mixing chamber (300) may be the main chamber of the desublimating heat exchanger (500); or, in some embodiments it may be located in a separate device such as a second desublimating heat exchanger. In some embodiments the second desublimating heat exchanger may be between 5% and 95% of the size of the first desublimating heat exchanger (500), that is the main desublimating heat exchanger. In some embodiments the second desublimating heat exchanger may be between 15% and 85% of the size of the first desublimating heat exchanger (500). In some embodiments the second desublimating heat exchanger may be between 25% and 75% of the size of the first desublimating heat exchanger (500). In some embodiments the second desublimating heat exchanger may be between 35% and 65% of the size of the first desublimating heat exchanger (500). In some embodiments the second desublimating heat exchanger may be between 45% and 55% of the size of the first desublimating heat exchanger (500).

Figure 4:
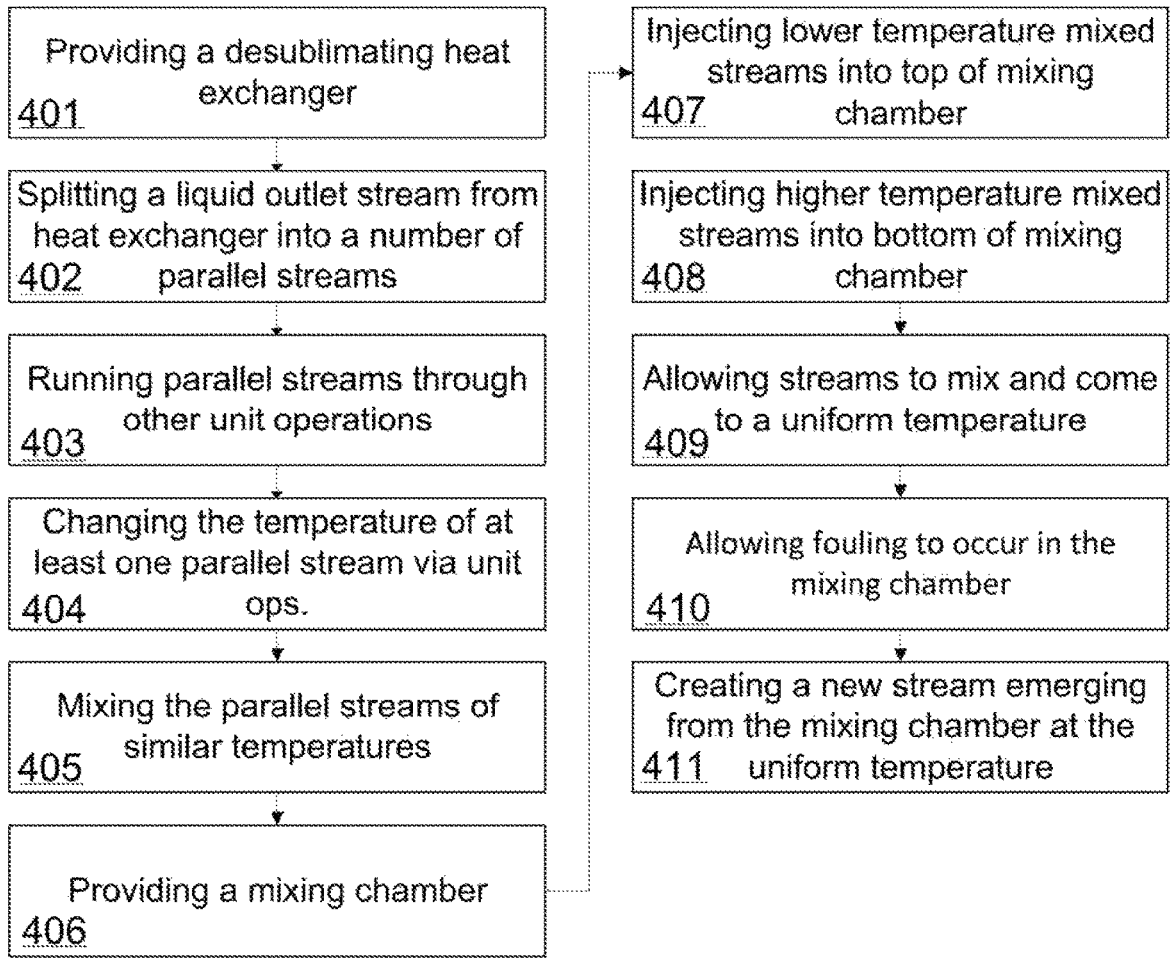
FIG. 4 is a diagram of a method for preventing fouling in a process using a desublimating heat exchanger

FIG. 4 is a method diagram for preventing fouling in a process using a desublimating heat exchanger. In Step 401 a desublimating heat exchanger may be provided. The heat exchanger may have a number of stages. Step 402 is splitting a liquid outlet stream from the desublimating heat exchanger into a plurality of parallel streams. The liquid outlet stream may be saturated with a solute, such as carbon dioxide. At least one of the parallel streams may contain the solute. In Step 403 the number of parallel streams may be passed through a number of discrete unit operations. In some embodiments, the unit operations may be a heat exchanger, a screw press, additional separation processes, or combinations thereof. Step 404 is changing the temperature of at least one of the number of parallel liquid streams via the unit operations. Step 405 is mixing the parallel streams of similar temperatures. In some embodiments, one of the parallel streams may pass through a screw press as a unit operation, and the temperature of that parallel stream may be changed. The outlet stream from the screw press may then be injected into another parallel stream before it passes through a heat exchanger. The parallel streams which are at a higher temperature may be mixed to form a warm stream, and the parallel streams which are at a lower temperature may be mixed to form a cool stream. Step 406 is providing a mixing chamber wherein the warm stream and the cold stream may be mixed. Step 407 is injecting the cool stream into the top of the mixing chamber. Step 408 is injecting the warm stream into the bottom of the mixing chamber. When a plurality of streams, such as a warm stream and a cold stream, have been injected into the mixing chamber, then the plurality of streams may collectively be referred to as the injected streams. Step 409 is allowing the injected streams to mix and come to a substantially uniform temperature in the mixing chamber. Mixing may occur simply due to density differences, as in FIG. 3, or the mixing chamber may comprise a stirring mechanism to mix the different temperature liquids. Step 410 is allowing the liquids in the mixing chamber to reach a substantially uniform temperature, and allowing any fouling that may occur to happen within the mixing chamber. For example, in some embodiments, a solid may freeze out of the solution. The solid may be the solute, such as carbon dioxide, mentioned in step 402. Step 411 is creating a new stream emerging from the mixing chamber at the substantially uniform temperature, which may be recycled back to the desublimating heat exchanger.

Figure 5:
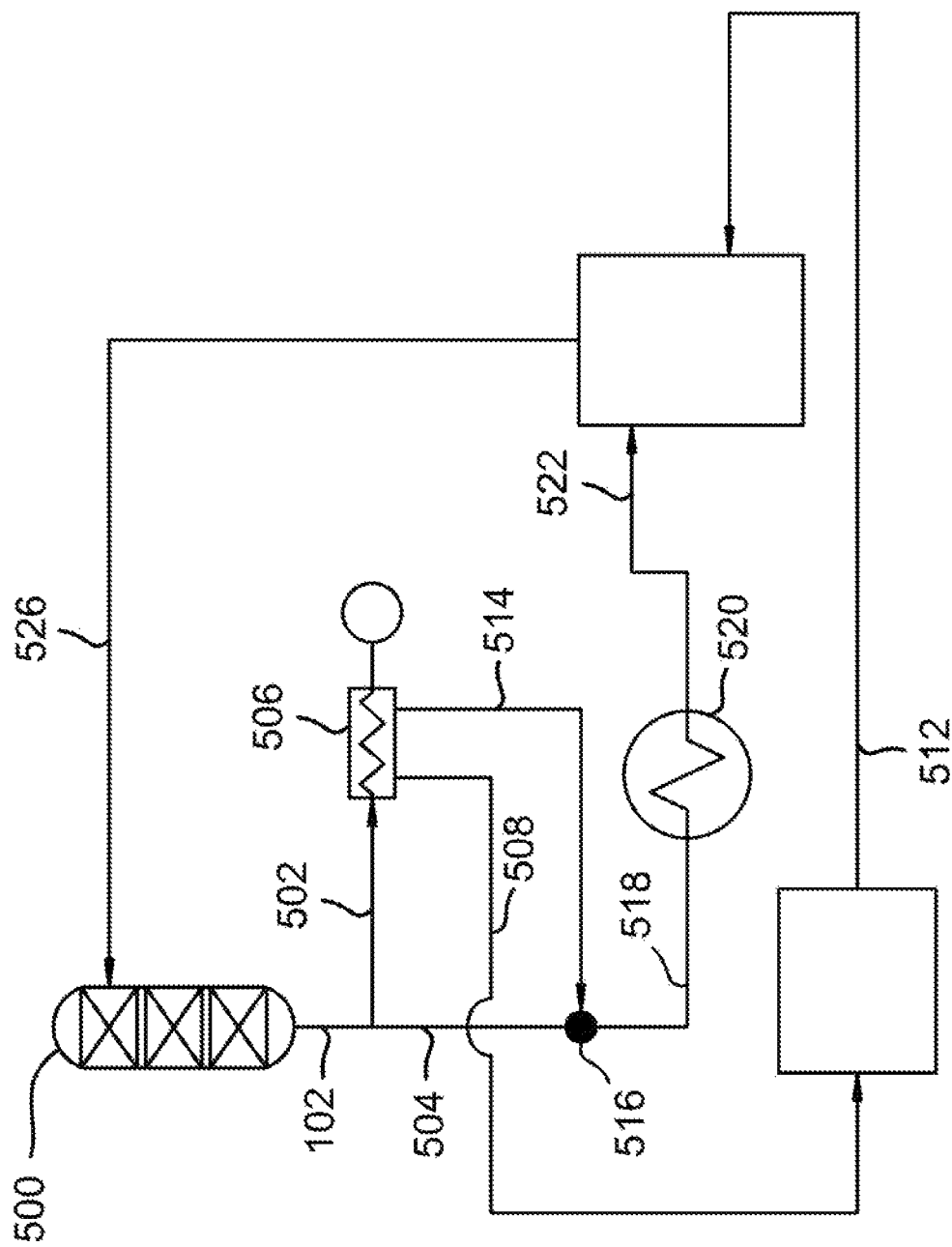
FIG. 5 is an illustration of an apparatus for preventing fouling in a process using a desublimating heat exchanger, with a separate mixing chamber.

FIG. 5 depicts an apparatus for preventing fouling in a process using a desublimating heat exchanger, with a separate mixing chamber. The apparatus may comprise a mixing chamber (300), and an exit stream (102) which may emerge from the desublimating heat exchanger (500). The exit stream (102) may be saturated with a solute, such as carbon dioxide. In some preferred embodiments, the exit stream (102) may be split into two parallel streams. The first parallel stream (502) may be sent through a screw press (506) with two outlet streams. The first outlet stream (508) may be sent through an additional separation process (510). The outlet stream from the separation process (512) may be sent to the mixing chamber (300). The second outlet stream (514) may be injected into the second parallel stream (504). The second parallel stream with the second outlet stream (518) may be sent through a heat exchanger (520). The outlet stream from the heat exchanger (522) may be sent to the mixing chamber (300).

In some embodiments, the mixing chamber (300) may be located downstream of the unit operations, and upstream of the desublimating heat exchanger (500). The mixing chamber (300) may be a tank configured to hold liquids of differing temperatures. In some embodiments, the mixing chamber (300) may comprise a stirring mechanism. In some preferred embodiments, the outlet stream from the separation process (512) may be at a higher temperature than the outlet stream from the heat exchanger (522). The outlet stream from the heat exchanger (522) may be injected into the mixing chamber (300). The outlet stream from the separation process (512) may be injected into the mixing chamber (300) after the outlet stream from the heat exchanger (522). The outlet stream from the separation process (512) may be injected into the mixing chamber (300) at the same time as the outlet stream from the heat exchanger (522), if the outlet stream from the separation process (512) is injected at a lower point than the outlet stream from the heat exchanger (522). The injected streams may be allowed to mix in the mixing chamber (300) and may reach a substantially uniform temperature.

Once the injected streams are mixed, they may exit the mixing chamber (300) as a mixed stream (526) at the substantially uniform temperature. The mixed stream (526) may then return to the desublimating heat exchanger (500) and recycle through the process.

Figure 6:
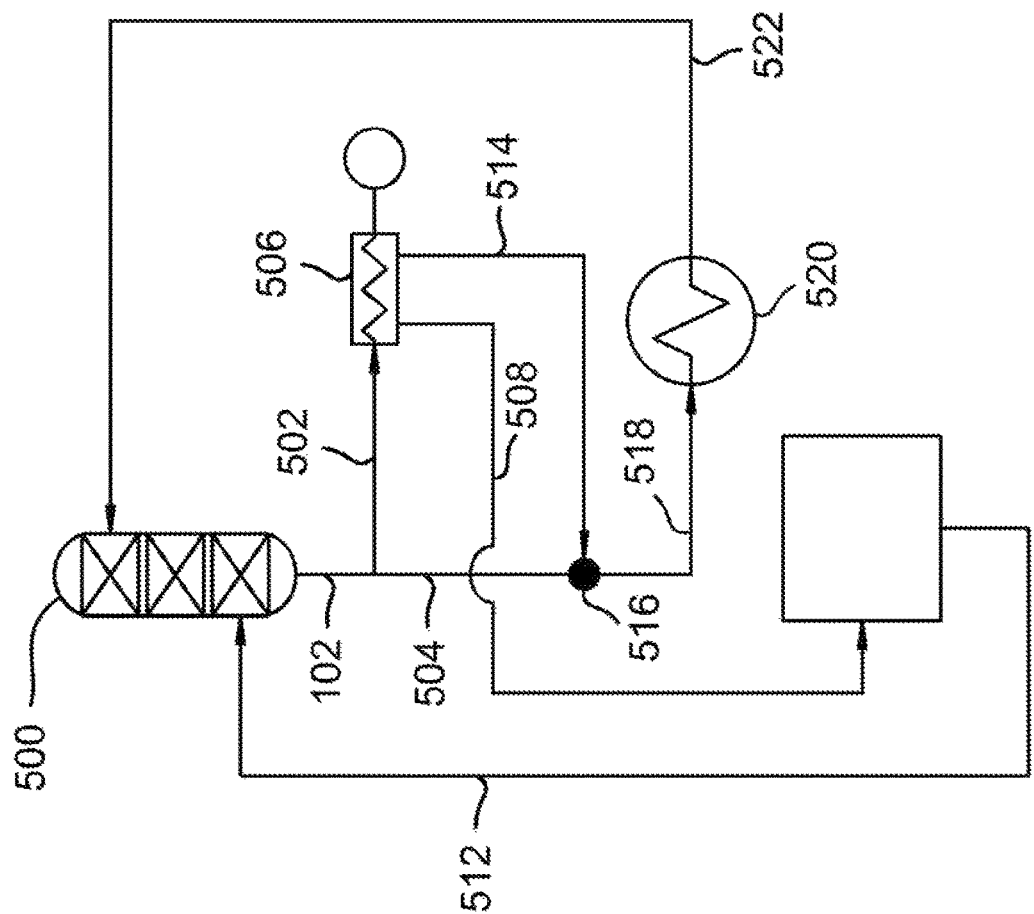
FIG. 6 is an illustration of the apparatus as in FIG. 5, wherein the mixing chamber is the desublimating heat exchanger.

FIG. 6 is an illustration of an apparatus similar to that of FIG. 5, wherein the mixing chamber is removed and the warm stream (512) and the cool stream (522) are recycled directly back to the desublimating heat exchanger (500). In some preferred embodiments, the outlet stream from the separation unit (512) may be at a higher temperature than the outlet stream from the heat exchanger (522) and the second outlet stream from the screw press (514). The second outlet stream from the screw press (514) may be injected into the second parallel liquid stream (504) before it runs through the heat exchanger. In these embodiments, the outlet stream from the separation unit (512) may be injected into the desublimating heat exchanger (500) near the bottom. In some embodiments, the outlet stream from the separation unit (512) may simply be returned to the warmer stage of the desublimating heat exchanger (500). The outlet stream from the heat exchanger (522) may be injected into the desublimating heat exchanger (500) near the top. In some embodiments, the outlet stream from the heat exchanger (522) may be injected into the desublimating heat exchanger (500) under the liquid level in the lower stage.

Figure 7:
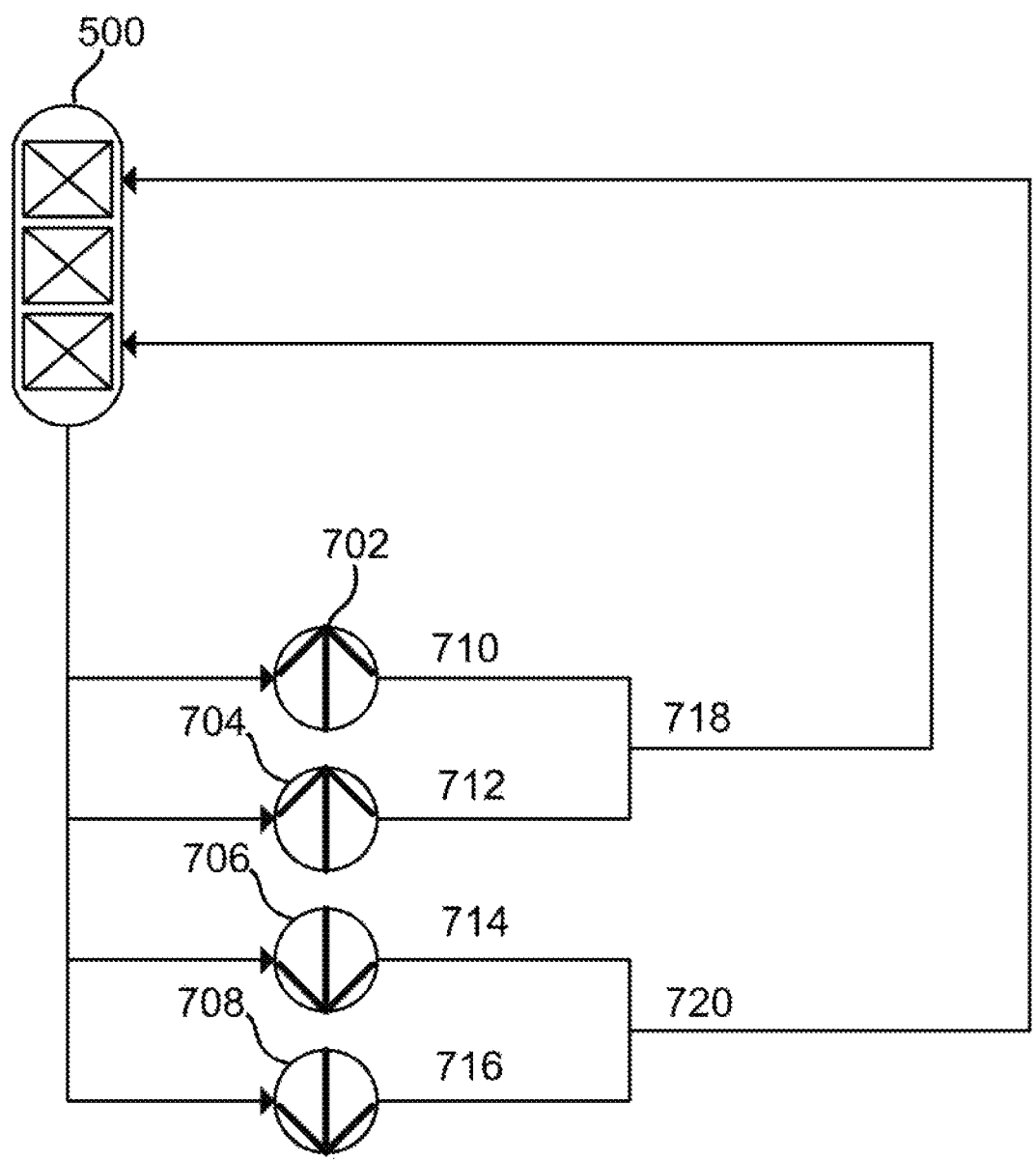
FIG. 7 is an illustration of a basic method for preventing fouling in a process using a desublimating heat exchanger where the mixing chamber is the desublimating heat exchanger.

FIG. 7 is an illustration of a basic method for preventing fouling in a process using a desublimating heat exchanger, wherein the mixing chamber is the desublimating heat exchanger (500). An exit stream (102) from the desublimating heat exchanger (500) may be split into four parallel streams. A first and second parallel stream may run through a first and second unit operation (702, 704), which may increase the temperature of the first and second streams. A third and fourth parallel stream may run through a third and fourth unit operation (706, 708), which may decrease the temperature of the third and fourth streams. The first and second streams (710, 712) may be warmer than the third and fourth streams (714, 716) upon emerging from the unit operations. The first and second streams (710, 712) may be mixed to form one warm liquid stream (718). The third and fourth streams (7114, 716) may be mixed to form one cool liquid stream (720). The warm liquid stream (718) may be injected directly back into the desublimating heat exchanger (500), and the cool liquid stream (720) may be injected directly back into the desublimating heat exchanger (500) at a point higher than the injection point of the warmer stream (718).

Figure 8:
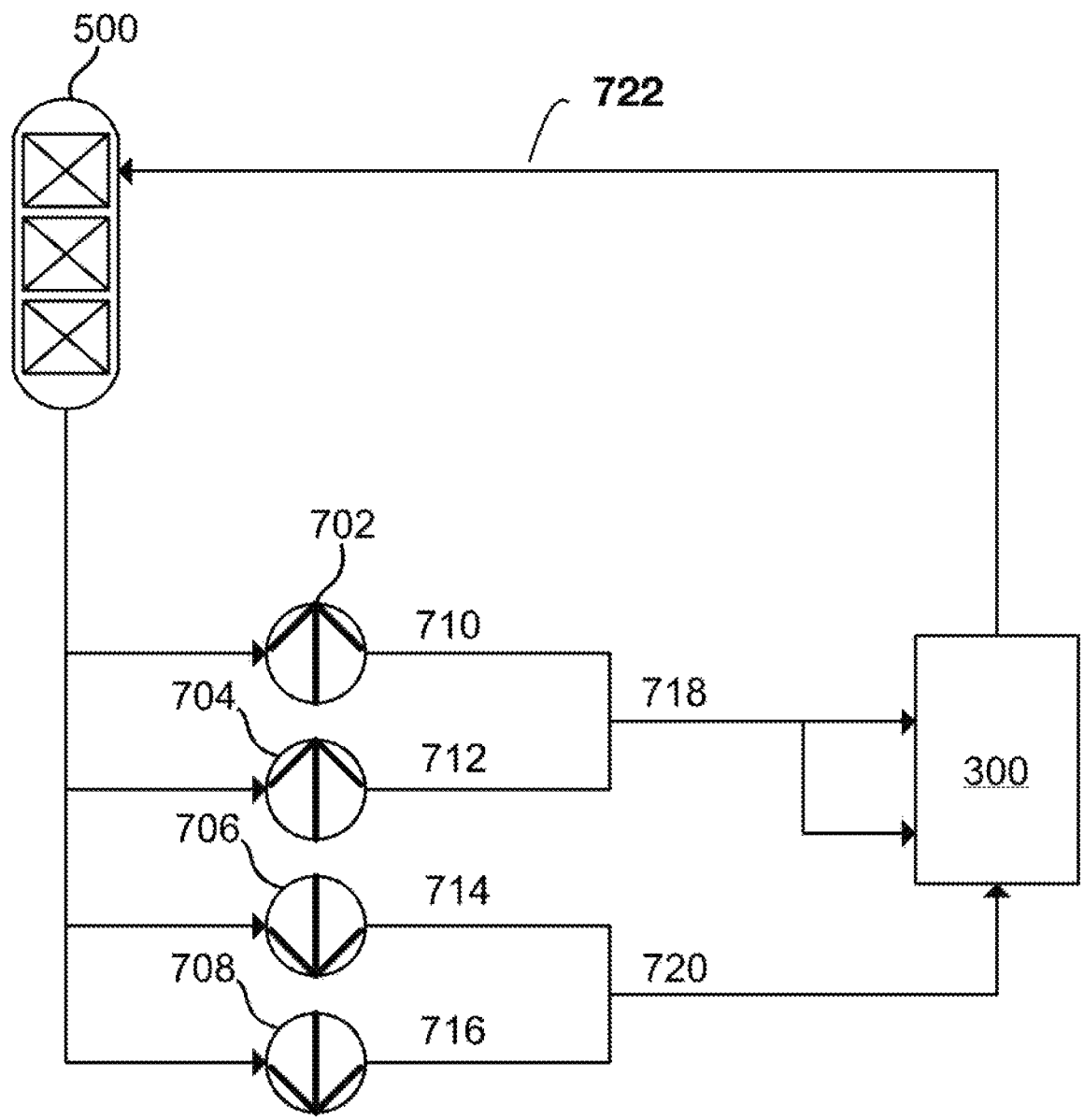
FIG. 8 is an illustration of a basic method for preventing fouling in a process using a desublimating heat exchanger with an external mixing chamber.

FIG. 8 is an illustration of a basic method for preventing fouling in a process using a desublimating heat exchanger with an external mixing chamber (300). An exit stream (102) emerging from the desublimating heat exchanger (500) may be split into a plurality of parallel streams. A first stream may be sent through a first unit operation (702), and a second stream may be sent through a second operation (704). The first unit operation (702) and the second unit operation (704) may increase the temperature of the first stream and the second stream. Likewise, a third and fourth stream may be run through a third (706) and fourth (708) unit operation, which may decrease the temperature. The outlet streams from the first and second unit operations (710, 712) may be at a higher temperature than the outlet streams from the third and fourth unit operations (714, 716), and may be mixed to form one warm liquid stream (718). The outlet streams from the third and fourth unit operations (714, 716) may be mixed to form one cool liquid stream (720). The cool liquid stream (720) may be injected into the mixing chamber (300) at a higher point than the warm liquid stream (718). After the injected streams are allowed to mix and reach a substantially uniform temperature, they may emerge from the mixing chamber (300) as a mixed stream at the substantially uniform temperature. The mixed stream may then be recycled back to the desublimating heat exchanger (500). A mixed stream (722) at a substantially uniform temperature is depicted.

Figure 9:
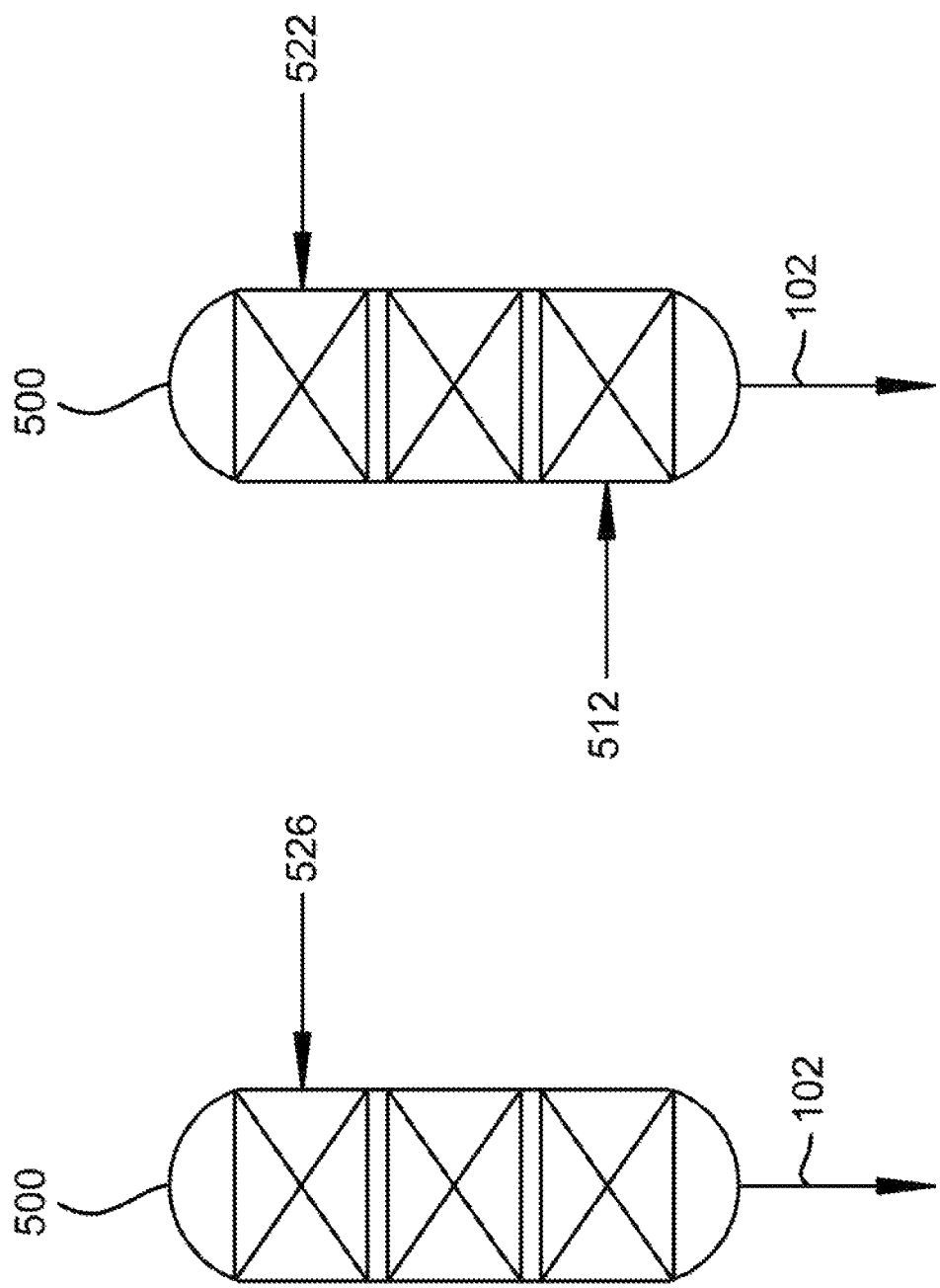
FIG. 9A is an illustration of the desublimating heat exchanger as in FIG. 5, showing inlet and outlet streams.
FIG. 9B is an illustration of the desublimating heat exchanger as in FIG. 6, showing inlet and outlet streams.

FIG. 9A is an illustration of the inlet and outlet streams for the desublimating heat exchanger, in an embodiment as in FIG. 5. The exit stream (102) may leave the desublimating heat exchanger (500) and may then be split into parallel streams. In some embodiments, there may be only one inlet stream to the desublimating heat exchanger (500). This stream may be the mixed stream emerging from the mixing chamber (526).

FIG. 9B is an illustration of the inlet and outlet streams for the desublimating heat exchanger, in an embodiment as in FIG. 6. The exit stream (102) may leave the desublimating heat exchanger (500) and may then be split into parallel streams. In some embodiments, there may be two inlet streams to the desublimating heat exchanger (500). The cool liquid stream (512) may be injected near the top of the desublimating heat exchanger (500). The warm liquid stream (522) may be injected near the bottom of the desublimating heat exchanger (500).

Figure 10:
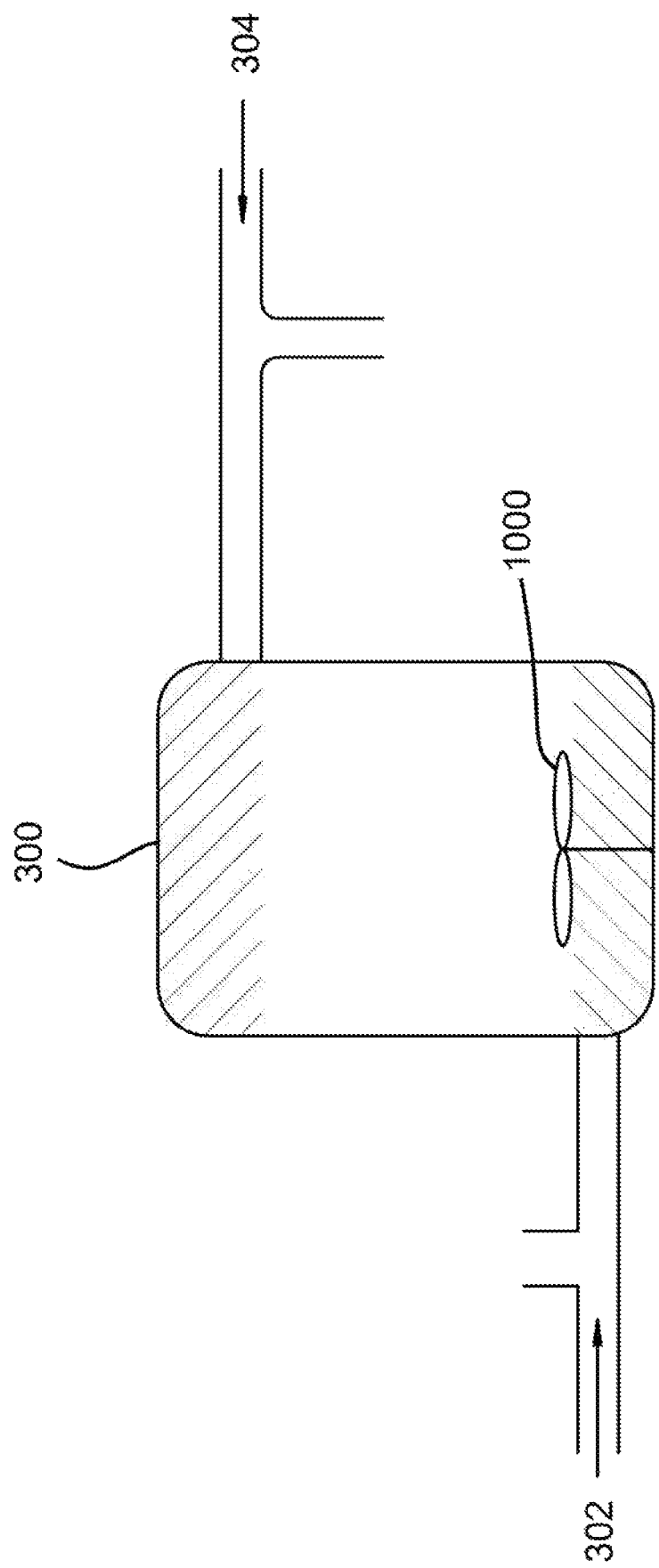
FIG. 10 is an illustration of a mixing chamber with a stirring mechanism to be used in a process as in FIG. 1.

FIG. 10 is a depiction of a mixing chamber (300) similar to the one in FIG. 3. In some embodiments, the mixing chamber (300) may comprise a stirring mechanism (1000). The stirring mechanism (1000) may be configured to mix the contents of the mixing chamber (300).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

The invention claimed is:

1. A method for removing a component from a gas stream, comprising:
    passing a liquid outlet stream out of a desublimating heat exchanger, the liquid outlet stream being at a temperature T1 and comprising a cryogenic contact fluid and a solute, a solid, or a combination of the solute and the solid;
    splitting the liquid outlet stream into a plurality of liquid streams;
    passing the plurality of liquid streams through unit operations, resulting in a plurality of liquid product streams each at different temperatures, wherein a warm liquid product stream comprises a warmest of the plurality of liquid product streams and a cold liquid product stream comprises a coldest of the plurality of liquid product streams;
    passing the warm liquid product stream into the mixing chamber at a first location and passing the cold liquid product stream into the mixing chamber at a second location, wherein the first and the second location are different;
    mixing the warm liquid product stream and the cold liquid product stream results in a recycle liquid stream, and wherein a portion of the solute freezes in the mixing chamber.

2. The invention of claim 1, wherein there are three liquid streams in the plurality of liquid streams and the cold liquid product stream is mixed with next coldest of the plurality of liquid product streams before the warm liquid product stream is mixed with the cold liquid product stream.

3. The invention of claim 1, wherein there are three liquid streams in the plurality of liquid streams and the warm liquid product stream is mixed with next warmest of the plurality of liquid product streams before the warm liquid product stream is mixed with the cold liquid product stream.

4. The invention of claim 1, wherein there are four liquid streams in the plurality of liquid streams and the warm liquid product stream is mixed with a next warmest of the plurality of liquid product streams and the cold liquid product stream is mixed with a next coldest of the plurality of liquid product streams before the warm liquid product stream is mixed with the cold liquid product stream.

5. The invention of claim 1, wherein the unit operations comprise a screw press, a second heat exchanger, or a separation unit.

6. The invention of claim 1, wherein the liquid outlet stream is saturated with a compound selected from the group consisting of carbon dioxide, nitrogen oxide, sulfur dioxide, nitrogen dioxide, sulfur trioxide, hydrogen sulfide, hydrogen cyanide, water, hydrocarbons, and combinations thereof.

7. The invention of claim 1, wherein the mixing chamber is a second desublimating heat exchanger.

8. The invention of claim 1, further comprising passing the recycle liquid stream into the desublimating heat exchanger.

* * * * *